(12) United States Patent
Smith et al.

(10) Patent No.: US 8,501,072 B2
(45) Date of Patent: Aug. 6, 2013

(54) DISPENSING VALVES

(75) Inventors: Matthew Eric Smith, Isle of Man (GB); Karl Mondszein, Mansfield (GB)

(73) Assignee: Carbonite Corporation, WTC (PA)

( * ) Notice: Subject to any disclaimer, the term of this patent is extended or adjusted under 35 U.S.C. 154(b) by 0 days.

(21) Appl. No.: 12/739,858

(22) PCT Filed: Oct. 13, 2008

(86) PCT No.: PCT/GB2008/003462
§ 371 (c)(1),
(2), (4) Date: Jun. 10, 2010

(87) PCT Pub. No.: WO2009/056792
PCT Pub. Date: May 7, 2009

(65) Prior Publication Data
US 2010/0244323 A1    Sep. 30, 2010

(30) Foreign Application Priority Data

Oct. 29, 2007 (GB) .................................. 0721185.7

(51) Int. Cl.
*B28B 5/02* (2006.01)
(52) U.S. Cl.
USPC ........... 264/294; 264/154; 264/155; 264/156; 264/163; 264/296; 264/322
(58) Field of Classification Search
USPC .................. 264/154–156, 163, 294, 296, 322
See application file for complete search history.

(56) References Cited

U.S. PATENT DOCUMENTS

| 5,033,655 | A |   | 7/1991  | Brown                  |
|-----------|---|---|---------|------------------------|
| 5,213,236 | A |   | 5/1993  | Brown et al.           |
| 5,257,560 | A | * | 11/1993 | Palazzolo .......................... 82/46 |
| 5,377,877 | A |   | 1/1995  | Brown et al.           |
| 5,409,144 | A |   | 4/1995  | Brown                  |
| 5,924,605 | A | * | 7/1999  | Baudin et al. ................. 222/494 |
| 6,503,440 | B2| * | 1/2003  | Kuehn et al. .................. 264/515 |

(Continued)

FOREIGN PATENT DOCUMENTS

| EP | 0405472 A  | 1/1991  |
| EP | 0816245 A  | 1/1998  |
| FR | 2690139 A  | 10/1993 |
| WO | 99/08942 A | 2/1999  |

OTHER PUBLICATIONS

International Search Report of PCT/GB2008/003462 dated Dec. 10, 2008.

*Primary Examiner* — Amjad Abraham
(74) *Attorney, Agent, or Firm* — Cowan, Liebowitz & Latman, P.C.; Mark Montague, Esq.

(57) ABSTRACT

A dispensing valve for flowable material comprises a valve plate (26) of resilient polymeric material in which at least one elongate discontinuity is formed. The discontinuity defines at least one valve flap (28) which is an integral part of the valve plate but whose margin defined by the discontinuity is not connected to the adjacent material of the valve plate. The valve flap (28) is movable under the application of pressure from a closed position, in which the adjacent margins of the discontinuity form a substantial seal, to an open position, in which the margins for the discontinuity are spaced from one another and material can flow through the valve member. The polymeric material is a polyolefin material and the discontinuity is a rupture line. The margins defining the rupture line are of decreasing thickness towards their free edge and overlie one another.

8 Claims, 4 Drawing Sheets

U.S. PATENT DOCUMENTS 6,641,319 B2 * 11/2003 May .............................. 401/132
7,171,882 B2 * 2/2007 Shteyngarts .................... 83/171
2004/0061247 A1 * 4/2004 Koyama et al. ............... 264/1.33
2004/0149675 A1 * 8/2004 Perry et al. .................... 215/228

* cited by examiner

DISPENSING VALVES

CROSS-REFERENCE TO RELATED APPLICATIONS

This application claims priority to International Application No. PCT/GB2008/003462 filed on Oct. 13, 2008 and Great Britain Application No. 0721185.7 filed Oct. 29, 2007, the entire disclosures of which are hereby incorporated by reference.

The present invention relates to dispensing valves for flowable material, such as beverages, flowable foodstuffs, eg mustard and ketchup, and flowable toiletries, such as moisturising cream.

The invention is concerned with such valves of the type comprising a valve member of resilient polymeric material, in which at least one elongate discontinuity is formed, the at least one discontinuity defining at least one valve flap which is an integral part of the valve member but whose margin defined by the discontinuity is not connected to the adjacent material of the valve member, the valve flap being movable under the application of pressure from a closed position, in which the adjacent margins of the discontinuity form a substantial seal, to an open position in which the margins of the discontinuity are spaced from one another and material can flow through the valve member. The invention relates also to container closures incorporating such a dispensing valve and to a method of making such valves and closures.

Dispensing valves of the type referred to above are known and are disclosed in e.g. U.S. Pat. Nos. 5,033,655, 5,213,236, 5,377,877 and 5,409,144. These known valves include a valve member of silicone rubber in which there are two elongate discontinuities in the form of two intersecting, perpendicular, linear cuts which define four valve flaps of segmental shape, the two linear edges of each of which engage with an adjacent edge of an adjacent flap, when in the closed position. The valve member is usually of concave shape and extends into the interior of the container which it seals and in this position the engaging edges of the flaps form a seal. If the interior of the container is pressurised, eg by squeezing the wall of the container, if it is a resilient material, the pressure causes the valve member to move into a convex configuration, in which it may extend slightly out of the container. The pressure causes the valve flaps to move pivotally about the lines along which they are connected to the remainder of the valve member into an open position, thereby creating an opening through which the content of the container may flow. When the pressure is relaxed, the flaps return under their own resilience to the sealed position and the valve member returns to its concave configuration.

Such valves are very effective and have an enjoyed wide commercial success. However, the use of silicone rubber is also associated with a number of disadvantages. Thus the surface of components made from silicone rubber is tacky and thus has a very high coefficient of friction and this means that handling and working with such components is problematic. Furthermore, the valve has to be connected in some manner to a container closure, eg a bottle lid, because it is of course not possible to make the entire closure from silicone rubber. However, this is a difficult process, particularly as silicone rubber cannot be heat fused, and the additional steps involved add significantly to the overall manufacturing costs. Furthermore, the resultant container closure then necessarily comprises quite different materials connected together and this is a significant problem as regards recycling the container and closure after use.

These problems are partially addressed by WO 99/08942 in which the valve member is made of thermoplastic material. This material may be easily handled and is heat sealable and the valve member may therefore be connected to a container closure by a heat sealing process, which is relatively rapid and simple. However, it is still necessary to make the valve member separate from the remainder of the container closure and then to connect these two components together. This is not only time-consuming and expensive but also still results in a composite container closure made of two different materials.

FR-A-2690139 discloses a valve member made of polyethylene or polypropylene which is formed with an elongate area of reduced thickness by virtue of the provision of an elongate recess in its internal surface. The thickness of the area of reduced thickness progressively decreases to a minimum towards one side. Pressure is applied by a tool to the internal surface of the portion of reduced thickness, which is thus caused to rupture along the one side to form a slit. The ruptured edge of the portion of reduced thickness is stretched by the rupturing to form a lip and thus subsequently overlies the opposite edge of the slit. Due to the fact that the rupturing occurs along one side edge of the recess, the opposite edge of the slit does not have a similar lip. However, only a single straight rupture line is formed and thus no movable valve flap is defined. In each of the first, third and fourth embodiments disclosed, the rupture line extends over the apex or around the periphery of a conical dispensing head and the rupture line is thus bent or curved. This means that the valve member thus does not have a valve flap which is movable with respect to the remainder of the valve and thus the valve is in fact incapable of dispensing any material. The second embodiment shown in FIGS. 5 and 6 has two elongate areas of reduced thickness, which intersect in a cruciform shape and each of which is of reducing thickness towards a long side. Although the specification refers to rupturing the valve along the lines of minimum thickness to form elastic flaps it also refers to forming two sets of perpendicular slits 14 along angles 18 and it is therefore clear that rectangular cruciform resilient valve flaps are not formed. Although two triangular areas partially defined by two perpendicular rupture lines are formed, the fact that the lines connecting the ends of the two sets of rupture lines are necessarily curved, due to the fact that the areas of reduced thickness are formed on a domed dispensing head, means that pivotal movement of these triangular areas is impossible and thus that no material can in fact be dispensed. It is, therefore, clear that this prior document is in fact only a "paper publication" and that the valve it purports to disclose will not in fact operate as a valve at all. Even if the rupturing process were to produce movable valve flaps capable of dispensing material from a container, the fact that only one marginal edge of the or each ruptured slit is elongated to form a lip which overlies the other edge means that no air could be admitted into the container to replace dispensed material and thus would mean that the valve would operate only as a one-way valve and not a two-way valve and thus that the container would progressively collapse as material is dispensed and this is highly undesirable in many cases.

It is therefore the object of the invention to provide a dispensing valve of the type referred to above and a one-piece container closure incorporating such a dispensing valve which uses only cheap and readily available materials and may be produced rapidly and cheaply in a single process and does not require the subsequent connection of the dispensing valve to a container closure. It is a further object to provide such a valve which will act as a two-way valve and will thus permit material to leave the container and air to enter it.

According to the present invention, a dispensing valve the type referred to above is characterised in that the valve member is of polyolefin material, that the at least one discontinuity is a rupture line and that the two margins defining the rupture line are of decreasing thickness towards their free edge and overlie one another.

Thus the valve in accordance with the invention is fundamentally different to the known valves of the type disclosed in the U.S. patents referred to above in that the or each elongate discontinuity is a rupture or tear line and not a clean cut. The manner in the material of the valve member is ruptured will be described in detail below. However, since polyolefins are inherently somewhat waxy, the rupturing process permanently deforms or stretches the plastic material along the rupture line before the actual rupture process occurs. This stretching process will inherently result in a local reduction in thickness of the valve member and rupture of the material occurs when the thickness locally becomes zero. After rupture has occurred, both the adjacent margins will be of decreasing thickness towards their free edge and one will necessarily somewhat overlie the other.

The inherent resilience of the polyolefin material will result in a contact pressure between the overlying margins of the discontinuity and the waxy surface quality of the material ensures that the contacting surfaces form a reliable seal. In order to ensure that the surface of the material has a degree of waxiness which optimises the integrity of the seal whilst ensuring that the contacting surfaces do not stick together, it is preferred that the melt flow index of the polyolefin material is between 10 and 45 g/10 minutes.

In use, the valve is applied to a flowable material container. When the pressure within the container is increased, e.g. by compressing its outer wall, the pressure acts on the valve flap and moves it away from the remainder of the valve member so as to create an opening through which the flowable material can then pass. The movement of the valve flap will be in rotation about an axis or integral hinge defined by a line extending between the adjacent ends of the or each discontinuity defining the valve flap. In order to ensure that the valve flap is moved adequately by the pressure that is applied to it and that, when it returns to its original position under the resilience of its integral hinge, its margins engage the margins on the other side of the or each discontinuity with an adequate contact pressure to create a reliable seal, it is important that the polyolefin material has an appropriate resilience and that the integral hinge has an appropriate thickness. It is preferred that the flexural modulus of elasticity of the integral hinge is between 200 and 1400.

It is found that the bending characteristics of the integral hinge are more predictable and reproducible if the valve plate is provided with a line of reduced thickness extending between the ends of the or each discontinuity defining the valve flap which defines the position of the integral hinge. The precise stiffness of the integral hinge may be set by precisely controlling the thickness of the integral hinge. The valve member is typically a plate with a thickness between 0.5 and 1.5 mm and the integral hinge is typically defined by a grove or line of reduced thickness and has a thickness of between 0.1 and 0.5 mm, preferably between 0.2 and 0.3 mm. In its simplest form, the valve member will have only a single discontinuity in it, e.g. generally of U-shape, so that the valve includes a single valve flap which is defined by the discontinuity and is connected to the remainder of the valve member along a line which extends between the two ends of the discontinuity. It may perhaps also be possible for there to be two perpendicular intersecting discontinuities in the manner similar to the prior art. However, this would result in four valve flaps connected to the valve member by relatively long integral hinges and the greater stiffness of polyolefin material as compared to silicone rubber may make this impractical. Furthermore, this would result in the movable margin of each valve flap cooperating with and intended to form a seal with a movable margin of the two adjacent flaps. It is found in practice that a more reliable seal is formed if the margin of the or each valve flap cooperates, at least over the majority of its length, with a margin formed on a stationary portion of the valve member and not on another valve flap.

In the preferred embodiment, there are four valve flaps arranged in a generally cruciform shape, each valve flap being of generally rectangular shape and being integrally connected to the valve member at its outer end. The four valve flaps may cooperate with one another in a variety of different ways but it is preferred that the margin of the inner end of each valve flap cooperates with the margin of the inner end of two adjacent valve flaps.

As mentioned above, the valve member is made of polyolefin material, preferably polypropylene or polyethylene, both of which are cheap and readily available materials. These materials are very suitable for making container closures, e.g. bottle caps and the like, and this therefore opens up the possibility of providing a one-piece container closure incorporating such a dispensing valve. Such a closure is in practice likely to be a unitary injection moulded component and will consist of a closure plate, which, in use, will extend over the mouth or dispensing opening of a container for flowable material, integral with which is a peripheral depending skirt for attachment to the container, the closure plate constituting the valve member.

The invention also embraces a method of making such a dispensing valve and thus according to a further aspect of the prevent invention a method of manufacturing a dispensing valve for flowable material comprises injecting hot, flowable polyolefin material into a mould cavity, which is partially defined by a first mould member on one side and a second movable mould member on the other side, the second mould member including a relatively movable rupture member, to form a valve member, forming one or more first elongate recesses in a surface, which is defined by the second mould member, of the valve member constituting one or more first lines of reduced thickness, permitting the polyolefin material to cool and solidify, moving the second mould member relative to the first mould member to create a gap, advancing the rupture member against the valve member to cause it to rupture along the first lines of reduced thickness and ejecting the valve member.

Thus, the valve in accordance with the invention is produced by a conventional injection moulding process. The mould cavity is defined, at least in part, by a first mould member and a second mould member on which one or more elongate projections or beads are formed. Hot polyolefin material is then injected into the mould cavity so as to form a valve member and the elongate projection or bead on the movable mould member will necessarily form one or more lines of reduced thickness in one surface of the valve member. The polyolefin material is then permitted to cool and solidify and whilst it is relatively warm the movable mould member is moved relative to the first mould member to create a gap. The rupture member is then advanced towards the valve member and this causes the portion of the valve member in which the or each line of reduced thickness is formed to deform and ultimately to tear or rupture along the lines of reduced thickness. The lines of reduced thickness are arranged such that the rupturing process will produce one or more valve flaps which are separated from the remainder of the valve member around much of their periphery but are integrally connected to it along a hypothetical line, which extends between the ends of the rupture lines or adjacent pairs of ends of the rupture lines, and this line will constitute an integral hinge about which the valve flap may pivot relative to the remainder of the valve member. The rupturing process will inherently result in localised stretching of the polyolefin material and this means that the margins of each discontinuity will not simply abut laterally against one another, as is the case when the discontinuity is formed by a cutting process, but will overlie one another to a certain extent. The overlying margins are of a material which inherently has a somewhat waxy surface character and they therefore form a seal. The fact that the valve flap was ruptured out of the material surrounding it means that it is inherently a perfect fit in the hole which it occupies.

As mentioned above, the or each valve flap will be connected to the remainder of the valve member along a hypothetical line which will constitute an integral hinge. This integral hinge will operate more effectively and in a manner which is readily predeterminable if it is defined by a second line of reduced thickness. The material thickness along the second line of reduced weakness is, however, preferably greater than that along the first line or lines of reduced thickness and this will of course ensure that the first lines of reduced thickness rupture whilst the second lines of reduced thickness do not. It is therefore preferred that the one or more first lines of reduced thickness define an elongate area which is integrally connected to the remainder of the valve member along a hypothetical line and that the method includes forming a second elongate recess along the said line to form a second line of reduced thickness along the said line, the second elongate recess having a smaller depth than the first elongate recess.

It is preferred that the ultimate valve has two or more valve flaps and the method therefore preferably includes forming a plurality of first elongate recesses to define a plurality of elongate areas and moving a respective rupture member against each elongate area to cause it to rupture along the first lines of reduced thickness. Each valve flap is therefore ruptured or torn free of the surrounding material by a respective rupture member and of course left connected to the remainder of the valve member by a respective integral hinge, which is preferably defined by a second line of reduced thickness. In the preferred embodiment, four elongate areas arranged in the cruciform shape are formed and the method includes forming a second line of reduced thickness at the outer end of each elongate area.

In order to ensure that the polyolefin material is sufficiently soft and ductile to be ruptured relatively easily, it is preferred that the polyolefin material is permitted to cool in the mould cavity to a temperature of between 40° C. and 70° C. before advancing the or each rupture member against the valve member to rupture it along the first lines of reduced thickness.

Further features and details of the invention will be apparent from the following description of one specific method of manufacturing a container closure cap incorporating a dispensing valve in accordance with the invention which is given by way of example only with reference to the accompanying drawings, in which.

Figure 1:
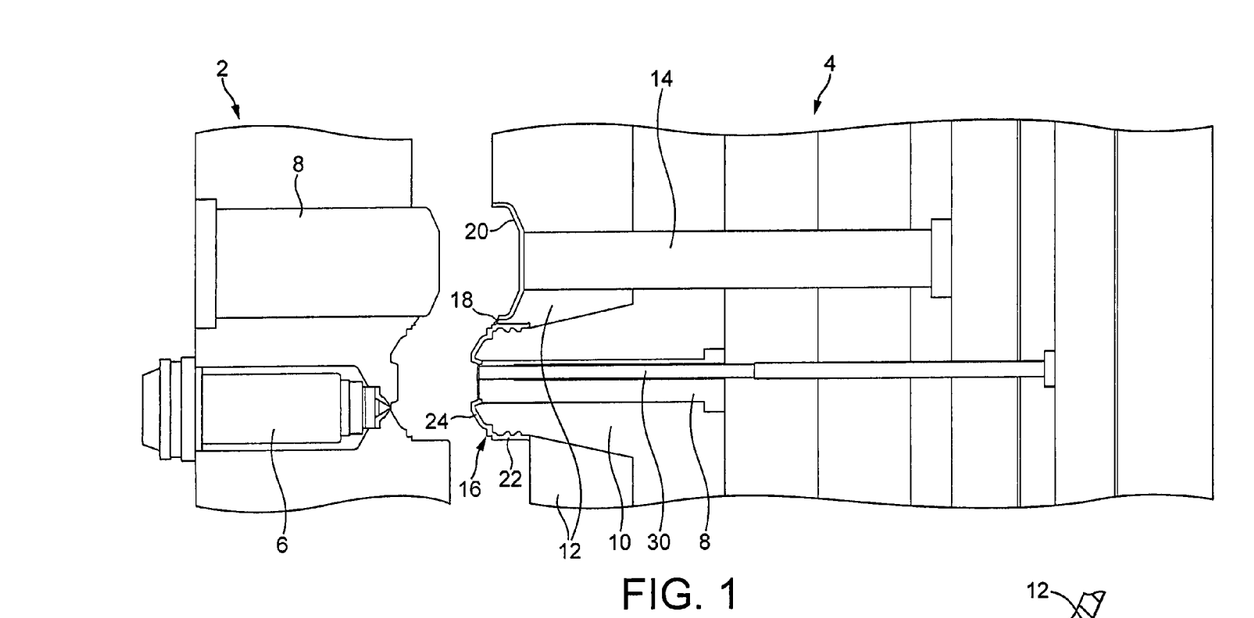
FIG. 1 is a partial sectional view of an injection mould for making a closure cap in accordance with the invention shown in the open position before rupturing the lines of reduced thickness.
Figure 2:
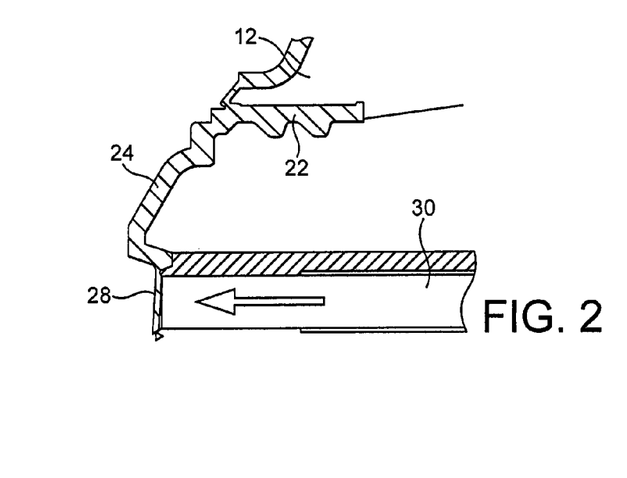
FIG. 2 is an enlarged view of part of FIG. 1 shown during rupturing of the lines of reduced thickness.
Figure 3:
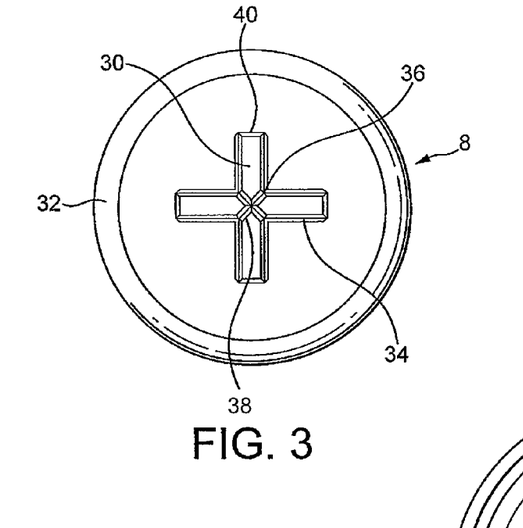
FIG. 3 is an end view of the inner core of the injection mould.

The injection mould shown in FIGS. 1 to 3 consist of a fixed mould portion 2 and a movable mould portion 4. The fixed mould portion 2 includes a molten plastic injection nozzle 6 and a stationary core 8. The movable mould portion 4 includes a core which comprises an inner core 8 surrounded by an outer core 10 and is surrounded by a stripper ring 12. The movable mould member also includes an ejector rod 14. When the two mould portions are moved together they define a closed mould cavity defining the shape of a closure cap comprising a cap portion 16 connected by an integral bridge 18 to a cover portion 20. The cap portion comprises a cylindrical side wall 22, integral with whose inner surface is a screwthread for connection with a corresponding screwthread on the external surface of the neck of a bottle or other container and integral with one end of which is a generally inwardly extending annular flange 24. Integral with the inner edge of the annular flange 24 is a substantially planar element constituted by a plate 26 in which four movable valve flaps 28 are defined, as will be described below.

Longitudinally movably accommodated within the inner core 8 are four rupture pins 30, only one of which is shown in FIG. 1 for the sake of clarity, each of which is movable between a retracted position, in which its end surface is flush with the end surface of the inner core, and an extended position in which it extends slightly beyond the end surface of the inner core. As may be seen in FIG. 2, the end surface of the inner core is slightly conical. As may be best seen in FIG. 3, extending around the conical end surface of the inner core 8 is a bevel or chamfer 32. Situated centrally within the end surface are four openings, each of which constitutes the end of a respective passage accommodating an ejector pin 30, the shape of which precisely matches that of the openings. The four openings and thus the four ejector pins 30 are of rectangular shape with the four rectangles being arranged in a cruciform shape offset from one another by 90°. At the inner end of each rectangle is a triangular extension and the apexes of the four triangles meet at a single point. Extending along each longitudinal side of each rectangular portion of the opening is an elongate upstanding formation or bead 34 of triangular cross-section, the height of which is about 0.6 mm. Each bead 34 associated with each opening meets a bead 34 associated with another opening to define a junction 36 and there are therefore four such junctions arranged in a square configuration. Extending between each diagonally opposed pair of junctions is a further triangular upstanding bead 38. The two beads 38 intersect at right angles at their centre. Extending along the outer end of each rectangular opening is a further upstanding bead 40, generally similar to the bead 34 but lower, that is to say in this case with a height of about 0.3 mm.

In use, the injection mould is closed and molten polyolefin material is injected through the injector 6 into the mould cavity to form the cap portion 16 connected by the integral bridge 18 to the cover 20. The beads 34, 38, 40 produce lines of reduced thickness in the underside of the plate 24, the shape and arrangement of which of course corresponds precisely to those of the beads. The moulding is then allowed to cool and solidify until it reaches a temperature of between about 40° C.

and 70° C., that is to say the plastic material is still warm and thus relatively soft, and the movable mould portion 4 is then moved away from the fixed mould portion 2 into the position shown in FIG. 2. The four rupture pins 30 are then advanced slightly, as shown in FIG. 2. Their end surfaces correspond to the area within the beads 34 and 40 and this causes the material within those beads to deform out of the plane of the plate 26. The end surfaces of the pins 30 match the conical shape of the end surface of the core 8 and the deforming force supplied by the pins therefore acts preferentially in the centre of the plate 26. As the plastic within the areas defined by the lines of reduced thickness is deformed upwardly, the material of the lines of reduced thickness begins to stretch and its thickness decreases. The thickness of the lines of reduced thickness formed by the beads 40 does not, however, decrease significantly, firstly because the force supplied to them is less due to the conical shape of the ends of the rupture pins and secondly because their material thickness is greater than that of the lines of reduced thickness formed by the beads 34 and 38. As the lines of reduced thickness formed by the beads 34 and 38 stretch, their thickness decreases progressively until it reaches zero, at which point rupture occurs. Four valve flaps 28 are thus formed, each of which has a shape defined by the rupturing which occurs along the lines of reduced thickness created by two parallel beads 34, the associated bead 40 and the two associated beads 38. Each valve flap 28 remains, however, connected to the plate 26 by the line of reduced thickness created by the associated bead 40, which now constitutes an integral hinge. As a result of the stretching which occurred at the lines of reduced thickness prior to rupture, the margins of each valve flap will no longer neatly abut the adjacent margins of the hole formed in the plate but will instead overlie those margins.

Whilst the valve flaps are formed by rupturing, the closure cap is retained in position on the movable mould member because its cylindrical side wall 22 is retained captive. Once the rupturing process is complete, the stripper ring 12 is advanced and due to the fact that a portion of the stripper ring engages the free end surface of the cylindrical side wall 22, this results in the moulded cap being forced free of the movable mould member. The moulded cap then has the appearance shown in FIG. 4. The cap portion may then be screwed to a bottle or other container for flowable material and the cover portion 20 may be pivoted using the bridge or integral hinge 18 into a position on top of the cap portion, where it may be retained by e.g. a snap fit. It will be appreciated that the cover portion is not essential and merely serves as a dust protector and to enhance the aesthetic appeal of the closure.

As mentioned above, the margins of the valve flaps 28 will overlie the margins of the apertures in the plate 26 at their outer ends and will overlie, or be overlain by, the margins of the adjacent flaps at their inner ends. Since this would mean that the valve flaps are deformed slightly out of the plane of the plate 26, the resilience of polyolefin material at the lines of reduced thickness formed by the beads 40 will mean that this contact is under pressure. Due to the inherently waxy surface quality of polyolefin material, this means that a reliable seal is formed. If the container is now inverted and pressure applied to its side wall to pressurise the contents, the flaps are caused to rotate outwardly about their integral hinges, thereby opening the container and permitting dispensing of its contents. If the container is now returned to its original orientation, the valve flaps will return to their original position under the resilience of the integral hinges and the seal of the container will be recreated.

Figure 4:
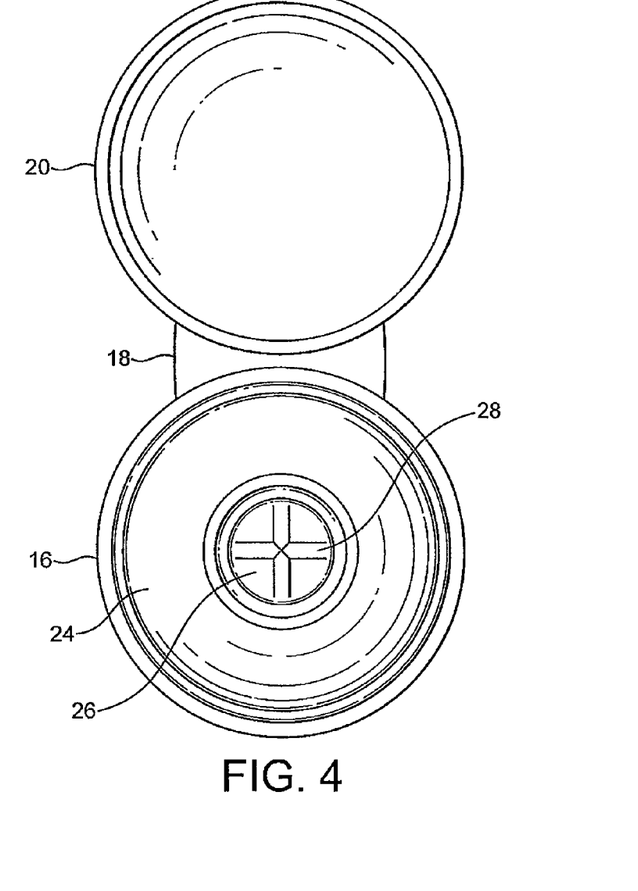
FIG. 4 is a plan view of the closure cap produced in the injection mould.
Figure 5:
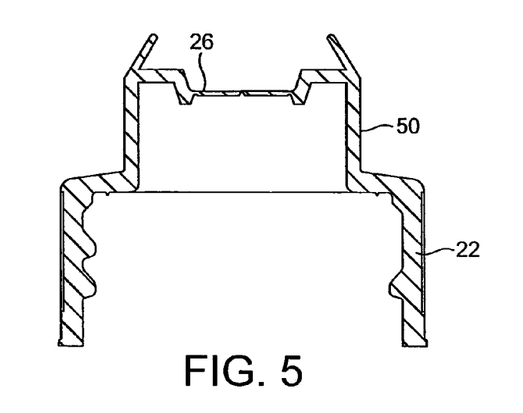
FIG. 5 is a vertical sectional view of a modified construction of closure cap.
Figure 6:
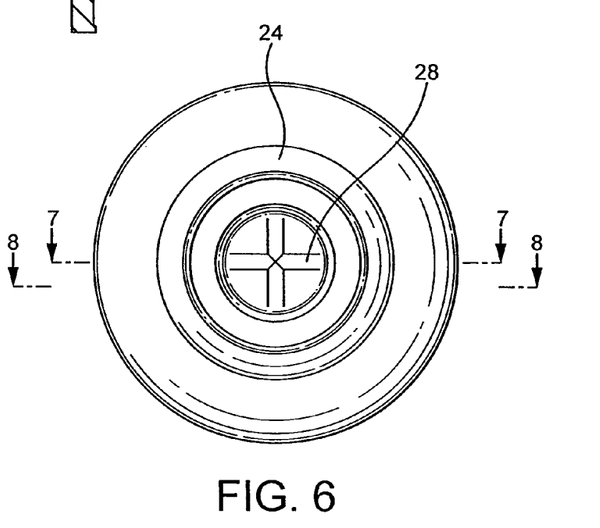
FIG. 6 is a plan view of the cap of FIG. 5.

The modified embodiment of closure cap shown in FIGS. 5 to 8 is very similar to that shown in FIG. 4, but in this case no lid portion is provided. The cylindrical side wall 22 for connection to the bottle is integrally connected to a further cylindrical portion 50 of smaller diameter and it is this latter cylindrical portion 50 which carries the plate 26 from which the valve flaps are formed.

Figure 7:
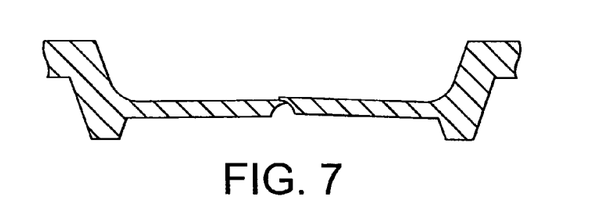
FIGS. 7 and 8 are partial sectional views along the line 7-7 and 8-8, respectively, in FIG. 6.
Figure 8:
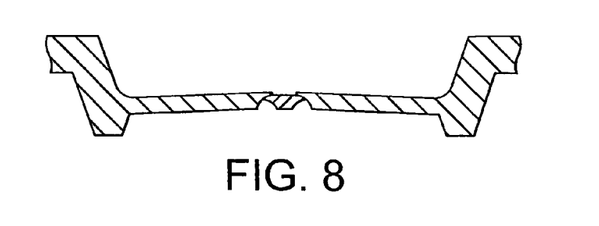

FIGS. 7 and 8 are cross-sectional views which show how the stretched margins of the valve flaps overlie one another and the margins of the holes formed in the plate 26 by the rupturing process. It is in practice immaterial which margin overlies the other and it will be understood that, in use, this may be frequently reversed but this has no adverse effect on the function.

Figure 9:
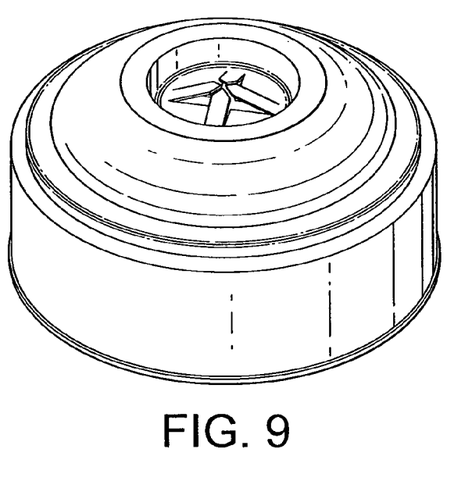
FIG. 9 is a perspective view of a further modified closure cap.

FIG. 9 is a perspective view of a further embodiment of closure cap in accordance with the invention which differs from the preceding embodiments only in details which are immaterial to the invention. It has, however, been included because it shows the valve flaps in the open position, which they adopt when flowable material is being poured from the container.

In a further modified embodiment, which is not illustrated, each valve flap is connected to the remainder of the lid by a respective hinge of so-called "bow tie" type. Such hinges are known per se and consist of a number of integral hinge lines and cut lines and serve to increase the force acting on the valve flaps tending to return them to the closed position. The use of such hinges will further increase the sealing integrity of the valve flaps in the closed position.

The invention claimed is:

1. A method of manufacturing a dispensing valve for dispensing flowable material comprising:
   injecting hot, flowable polyolefin material into a mould cavity, which mould cavity is defined by a first mould member on one side and a second mould member on the other side, the second mould member including at least one movable rupture member,
   the second mould member creating one or more first elongate recesses in a surface of the dispensing valve, thereby creating one or more first lines of reduced thickness for subsequently forming a valve member having one or more valve flaps connected via an integral hinge,
   permitting the polyolefin material to cool to a temperature of between 40° C. and 70° C. and thus solidify to provide a the valve member which is still warm and soft,
   moving the second mould member relative to the first mould member to create a gap,
   advancing the at least one rupture member against the valve member while the valve member is at said temperature to initially cause stretching that reduces the thickness at the first lines of reduced thickness,
   then rupturing the stretched and reduced thickness recesses with a respective rupture member to provide one or more apertures, each of which is occupied by a respective one of said valve flaps, which flap is connected with the valve member by said integral hinge, the valve flap having first margins and the one or more apertures having second margins, the first and second margins overlapping each other, the first and second margins having varying thickness increasing from a minimum at the free edge of the margins to a maximum at a line spaced from the free edge of the margins, and
   ejecting the valve member.

2. A method as claimed in claim 1, wherein the hinge is formed by defining an elongate recess, the elongate recess having a smaller depth than the one or more first elongate recesses.

3. A method as claimed in claim 1, including forming a plurality of first elongate recesses to define a plurality of elongate areas and moving each said respective rupture member against each said elongate area to cause them to rupture along the first elongate recesses.

4. A method as claimed in claim 2, including forming a plurality of first elongate recesses to define a plurality of elongate areas and moving each said respective rupture member against each said elongate area to cause them to rupture along the first elongate recesses.

5. A method as claimed in claim 2, in which four elongate areas arranged in a cruciform shape are formed and the method includes forming hinge defining lines of reduced thickness at the outer end of each said elongate area.

6. A method as claimed in claim 3, in which four elongate areas arranged in a cruciform shape are formed and the method includes forming hinge defining lines of reduced thickness at the outer end of each said elongate area.

7. A method as claimed in claim 1, in which the polyolefin material has a melt flow index of between 10 and 45 g/10 minutes.

8. A method as claimed in claim 1, in which the mould cavity is shaped to form a one-piece container closure comprising a closure plate, which constitutes the valve member and, in use, extends over a dispensing opening of a container for flowable material and integral with which is a peripheral skirt for connection to the container.

\* \* \* \* \*